(12) United States Patent
Shin et al.

(10) Patent No.: US 9,222,793 B2
(45) Date of Patent: Dec. 29, 2015

(54) COMMUNICATION-BASED NAVIGATION SYSTEM

(71) Applicant: LOC&ALL Inc., Seoul (KR)

(72) Inventors: Myoung Jin Shin, Seoul (KR); Kwang Jin Oh, Seoul (KR); Hee Man Park, Gwangmyeong (KR)

(73) Assignee: LOC&ALL Inc. (KR)

( * ) Notice: Subject to any disclaimer, the term of this patent is extended or adjusted under 35 U.S.C. 154(b) by 0 days.

(21) Appl. No.: 14/019,902

(22) Filed: Sep. 6, 2013

(65) Prior Publication Data

US 2014/0074403 A1 Mar. 13, 2014

(30) Foreign Application Priority Data

Sep. 7, 2012 (KR) .................. 10-2012-0099590

(51) Int. Cl.
*G01C 21/34* (2006.01)
*G08G 1/0968* (2006.01)

(52) U.S. Cl.
CPC ........ *G01C 21/3492* (2013.01); *G01C 21/3415* (2013.01); *G08G 1/096816* (2013.01); *G08G 1/096844* (2013.01)

(58) Field of Classification Search
None
See application file for complete search history.

(56) References Cited

U.S. PATENT DOCUMENTS

| | | | | |
|---|---|---|---|---|
| 7,689,348 | B2 * | 3/2010 | Boss et al. | 701/117 |
| 2004/0088106 | A1 * | 5/2004 | Omi | 701/200 |
| 2005/0222764 | A1 * | 10/2005 | Uyeki et al. | 701/210 |
| 2007/0135990 | A1 * | 6/2007 | Seymour et al. | 701/117 |
| 2010/0324775 | A1 * | 12/2010 | Kermani et al. | 701/33 |
| 2011/0098915 | A1 * | 4/2011 | Disatnik et al. | 701/201 |
| 2011/0320630 | A1 * | 12/2011 | Mogul et al. | 709/232 |

FOREIGN PATENT DOCUMENTS

| | | | | |
|---|---|---|---|---|
| JP | 07-083685 | A | | 3/1995 |
| JP | 10-281790 | A | | 10/1998 |
| JP | 2000-055683 | A | | 2/2000 |
| JP | 2003-106857 | A | | 4/2003 |
| JP | 2003-194561 | A | | 7/2003 |
| JP | 2008-232836 | A | | 10/2008 |
| JP | 2010-032543 | A | | 2/2010 |
| JP | 2010-032543 | | * 12/2010 | ............ G01C 21/00 |
| JP | 2011-094983 | A | | 5/2011 |
| JP | 2012-159433 | A | | 8/2012 |
| KR | 2008-0000418 | A | | 1/2008 |

* cited by examiner

*Primary Examiner* — John R Olszewski
*Assistant Examiner* — Jess Whittington
(74) *Attorney, Agent, or Firm* — Harness, Dickey & Pierce, P.L.C.

(57) ABSTRACT

A communication-based navigation system that detects a traffic volume change and searches for a route. The system comprises terminal retaining geographic information and generating a route request and a traffic condition check request; traffic analysis server having at least one database corresponding to and in communication with the terminal; and service server receiving route request from the terminal for searching for route and transmitting searched route to the terminal and traffic analysis server, and relaying the traffic condition check request from the terminal to traffic analysis server. Traffic analysis server stores in database the searched route from service server and traffic conditions in the searched route and is responsive to the traffic condition check request signal for detecting traffic condition change from comparing a current traffic condition in the searched route with a previous traffic condition stored in the database and for transmitting the traffic condition change.

11 Claims, 5 Drawing Sheets

Prior Art

COMMUNICATION-BASED NAVIGATION SYSTEM

RELATED APPLICATIONS

The present application is based on, and claims priority from, Korean Patent Application Number 10-2012-0099590, filed Sep. 7, 2012, the disclosure of which is hereby incorporated by reference herein in its entirety.

TECHNICAL FIELD

The present disclosure in some embodiments relates to a communication-based navigation system for searching for a route by detecting a change in the traffic volume. More particularly, the present disclosure relates to a communication-based navigation system which controls the frequency of route recalculations by storing and comparing traffic volume for each route with the current traffic and determining whether a route recalculation is necessary.

BACKGROUND

The statements in this section merely provide background information related to the present disclosure and may not constitute prior art.

A communication-based navigation system has a server providing a travel route to a terminal adapted to show a driver the route by using map and voice. A faster route may be obtained by utilizing traffic information. It is common for TPEG (Transport Protocol Expert Group) and other communication type navigation systems to automatically recalculate a route in a 5 to 10-minute cycle, depending on the setting of options to reflect real-time traffic information. Such rerouting searches frequently impose heavy load on the server, just to end up repeating the same path, which leads to waste of system resources.

A technology is necessary for reducing the server load and at the same time providing an optimal route.

SUMMARY

In accordance with some embodiments, a communication-based navigation system comprises a terminal, a traffic analysis server and a service server. The terminal is configured to retain geographic information and generate a route request signal and a traffic condition check request signal. The traffic analysis server is configured to have at least one database corresponding to the terminal and communicate with the terminal. The service server is configured to receive the route request signal from the terminal, perform a search for at least one route to produce and transmit an optimal route to the terminal and the traffic analysis server, and forward the traffic condition check request signal received from the terminal to the traffic analysis server. The traffic analysis server stores in the database the optimal route received from the service server and a traffic condition along the optimal route, in response to the traffic condition check request signal, detects a traffic condition change by comparing a current traffic condition along the optimal route with a previous traffic condition stored in the database, and transmits the detected traffic condition change to the terminal via the service server.

With the communication-based navigation system, the traffic conditions stored in the service server and in the traffic analysis server are updated in real time to analyze the route or perform the traffic condition check.

The communication-based navigation system provides the service server which performs a route recalculation from a current location to a destination upon receiving a route recalculation request from the terminal which has received the detected traffic condition change. The service server provides the recalculation result together with the database stored traveled route from an initial point of departure to the current location.

The communication-based navigation system enables the service server, after performing the route recalculation, to provide the recalculation result together with the database stored traveled route from the initial point of departure to the current location.

With the communication-based navigation system, the traffic analysis server stores the traffic condition by the route for each link along the route.

In addition, the traffic condition change calculation unit of the communication-based navigation system compares the traffic condition stored in the database with the traffic condition currently obtained based on a density of traffic for each link on the route, detects the traffic condition change by link, and decides a route recalculation is necessary or not based on whether it is determined that a ratio of the number of the links of which the traffic condition is changed over the number of the all the links on the route exceeds a threshold.

In addition, the traffic condition change calculation unit of the communication-based navigation system compares the current traffic condition with the traffic condition stored in the database by storing a speed of traffic by link along the route, and decides a route recalculation is necessary or not based on whether it is determined a ratio of a current sum of differences in speed over a stored sum of differences in speed exceeds a threshold.

In addition, the traffic condition change calculation unit of the communication-based navigation system compares the current traffic condition with the traffic condition stored in the database, and decides a route recalculation is necessary or not based on whether it is determined a ratio of an estimated time for a driving at the time of the search for the route over a currently estimated time for the time exceeds a threshold.

Another embodiment of the present disclosure provides a server for communication-based navigation, the server comprising an input/output unit, a route searching unit, a database and a traffic condition change calculation unit. The input/output unit is configured to exchange information with a terminal. The route searching unit is configured to receive a route search request signal from the terminal through the input/output unit and perform a search for at least one route considering a traffic condition. The database is configured to store the traffic condition for each link on the route. The traffic condition change calculation unit is configured to receive a traffic condition check request from the terminal through the input/output unit, detect a traffic condition change by comparing a current traffic condition for each link with the traffic condition stored for each link in the database, and calculate a detected traffic condition change or an optimum frequency of traffic condition check requests.

Yet another embodiment of the present disclosure provides a route recalculation method performed by detecting a change in traffic volume, the method comprising requesting from a terminal to a service server for performing a route search based on a current location and a destination; providing a navigation capability by producing and transmitting an optimal route to the terminal and storing in a database the optimal route and a traffic condition information in the optimal route; requesting from the terminal to the service server for a traffic condition check based on the current location; deciding whether a route recalculation is necessary or not by comparing the traffic condition information stored in the database with a traffic condition information corresponding to the current location; and reducing the frequency of requesting from the terminal for the route search or for the traffic condition check if the route recalculation is not necessary, and providing a recalculated route to the terminal if the route recalculation is necessary.

According to the present disclosure as described above, server resources are saved by a simple operation of storing and comparing traffic volumes for each route with respect to an insignificant traffic condition change rather than performing route recalculations, which can decrease the frequency of communications between the terminal and the server.

REFERENCE NUMERALS

210: Service server input/output unit
230: Traffic analysis server input/output unit
S316: Step between terminal and service server of requesting traffic condition check
S318: Step between service server and traffic analysis server of requesting traffic condition check
S320: Step between traffic analysis server and service server of transmitting detected traffic condition change
S322: Step between service server and terminal of transmitting detected traffic condition change

DETAILED DESCRIPTION

The present embodiment provides a technology for adjusting the rate of route recalculation request by a terminal in travel to reduce load on navigation server.

Hereinafter, at least one embodiment of the present disclosure will be described in detail with reference to the accompanying drawings.

In the following description, like reference numerals designate like elements although the elements are shown in different drawings. Further, in the following description of the at least one embodiment, a detailed description of known functions and configurations incorporated herein will be omitted for the purpose of clarity and for brevity.

Additionally, in describing the components of the present disclosure, terms like first, second, A, B, (a), and (b) are used. These are solely for the purpose of differentiating one component from another, and one of ordinary skill would understand the terms are not to imply or suggest the substances, order or sequence of the components. If a component is described as 'connected', 'coupled', or 'linked' to another component, one of ordinary skill in the art would understand the components are not necessarily directly 'connected', 'coupled', or 'linked' but also are indirectly 'connected', 'coupled', or 'linked' via a third component.

At least one embodiment of the present disclosure solves the deficiencies of the prior art by proposing a method for presuming in a terminal the circumstances actually requiring a route recalculation and issuing a route recalculation request only in the premises of such circumstances. The route recalculation is occasionally effective when changes in the traffic condition are so great that the fastest route needs a recalculation. Therefore, lowering the frequency of requesting route recalculations for an insignificant traffic condition change can reduce the network traffic by the terminal and the computation by a server.

Figure 1:
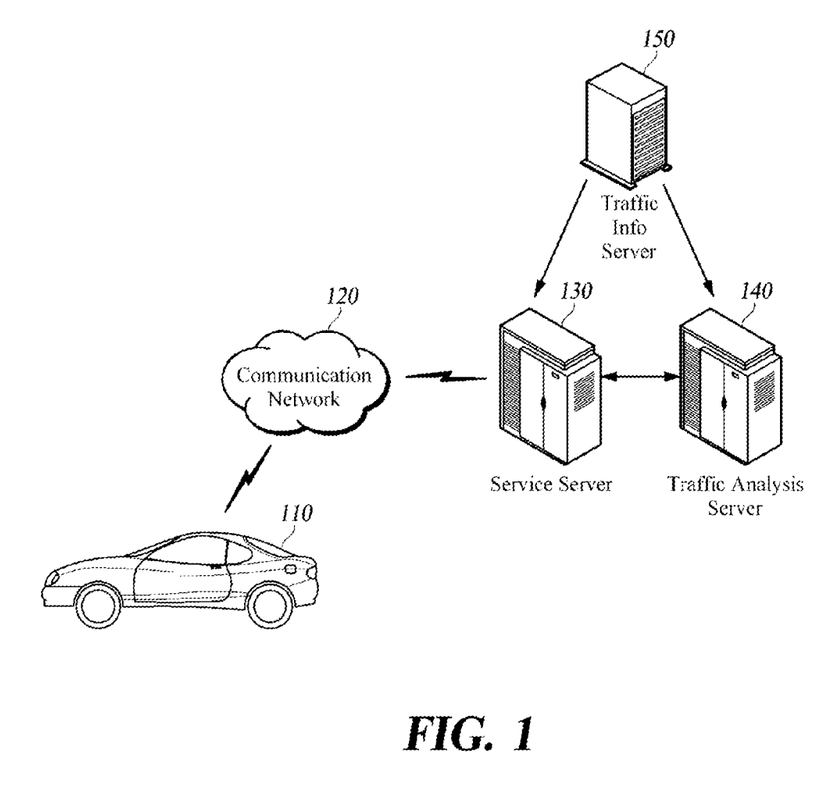
FIG. 1 is a conceptual schematic diagram of a navigation system for prompting route search according to at least one embodiment of the present disclosure.

FIG. 1 is a schematic diagram of a path notification system according to at least one embodiment of the present disclosure.

Referring to FIG. 1, the path notification system includes a terminal 110 provided to a driver, a service server 130 for transmitting and receiving information to and from the terminal 110, a traffic analysis server 140 for receiving an information request for a traffic condition change and route from the service server 130 and supplying the requested data. The service server 130 and the traffic analysis server 140 are separately illustrated for the purpose of illustration but a single server can be made to perform the functions of the two servers.

The terminal 110 can be powered with a vehicular electric power or on-board electrical power supply and can perform bidirectional communications with the service server 130 through a communication network 120. The terminal 110 is equipped with a global positioning system (GPS) navigation capability in itself or alternatively interworks with a device capable of GPS navigation to supply a user with information on traffic condition received from the service server 130.

The service server 130 exchanges information with the terminal 110 and the traffic analysis server 140 and stores the source of information received from the terminal 110 by terminal and provides the source to a specific terminal 110. In addition, the service server 130 operates to provide information on a route that links the location of the terminal 110 and the destination location.

The traffic analysis server 140 receives and analyzes information on the road and the real-time traffic condition and stores the analysis results such as the traffic condition of each section of the road and information on the traffic condition of the terminal in the database 250 therein. The traffic analysis server 140 includes a traffic condition change calculation unit 240 for calculating a rate of traffic condition changes as suggested by the present disclosure.

A traffic information server 150 supplies traffic information to be used by the service server 130 for performing a route search and to be referenced by the traffic analysis server 140 for calculating changes in the traffic condition. The traffic information server need not be a form of a server as long as it has a function of providing traffic information, and therefore any forms of information providers will work once they provide the traffic information of the entire road or traffic information of a route of the terminal.

Figure 2:
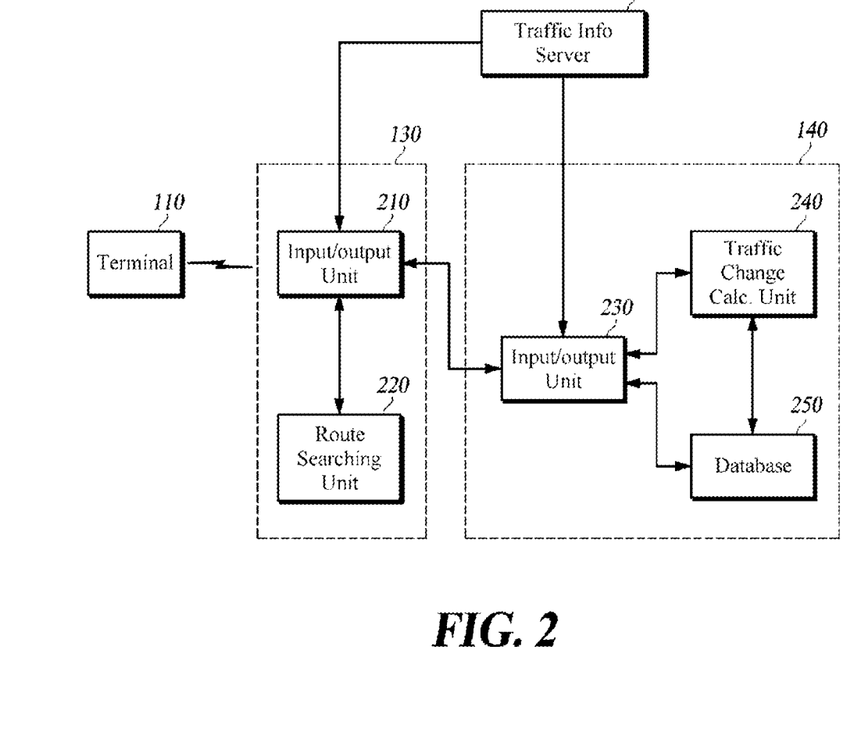
FIG. 2 is a module diagram of a navigation system for prompting route search according to at least one embodiment of the present disclosure.

FIG. 2 is a block diagram of a route notification system according to at least one embodiment of the present disclosure.

The service server 130 includes an input/output unit 210 and a route searching unit 220. The input/output unit 210 connects the service server 130 to the terminal 110 and the traffic analysis server 140 or through the communication network 120. The route searching unit 220 searches route from a current position of the terminal 110 to its destination by taking into account the real-time changes in traffic condition.

The traffic analysis server 140 includes an input/output unit 230 connected to the service server 130 for receiving a newly found route, a traffic condition check request, identification information of the terminals 110 or changes in traffic volume to the database 250. The traffic condition change calculation unit 240 in the traffic analysis server 140 receives a traffic condition check request signal from the input/output unit 230, determines whether a traffic condition change is so significant as to perform a route recalculation, and upon receiving a recalculated route, analyzes the traffic condition according to the recalculated route. The database 250 in the traffic analysis server 140 receives traffic conditions for each route from the traffic condition change calculation unit 240 and stores the received traffic conditions together with the route for each terminal.

As mentioned in the description of FIG. 1, in case where a communication-based navigation server is implemented with the service server 130 and the traffic analysis server 140 constitute a single body, the input/output units 210 and 230 of the otherwise separate servers may be consolidated into one module for the common functions of receiving and transmitting input/output information and traffic conditions from and to the terminals. The single module may be configured to include the database 250, traffic condition change calculation unit 240 and route searching unit 220.

Figure 3:
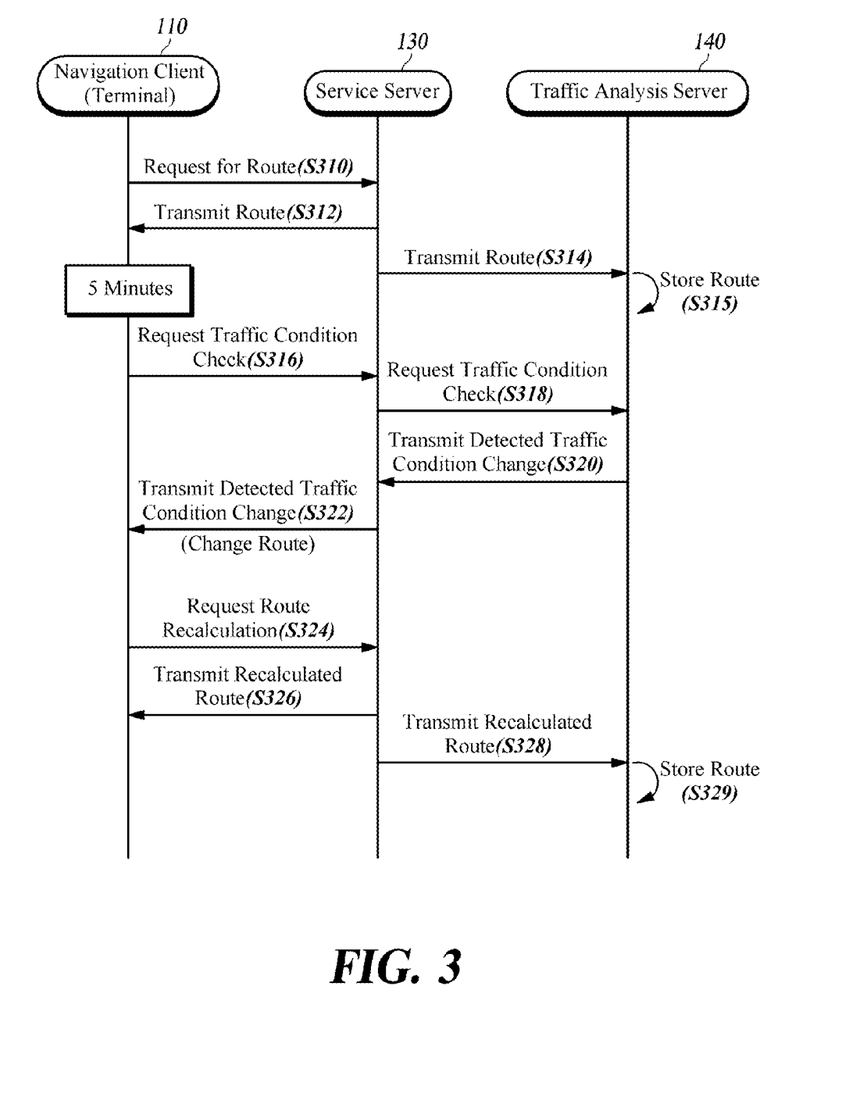
FIG. 3 is a flowchart of a route recalculation method with a traffic analysis performed to prompt a route recalculation according to at least one embodiment of the present disclosure.

FIG. 3 is a flowchart of a route recalculation method which is a result of s traffic analysis according to at least one embodiment of the present disclosure.

As a navigation client, the terminal 110 requests the service server 130 for a route or a traffic condition check, and obtains information therefor. It should be noted that conventional methods lack a step for requesting the traffic condition check.

The navigation client uses the communication network 120 to transmit information on the current location of the terminal 110 and its destination to the service server 130 and requests for route information in the route request step S310. The service server 130 generates the route information by using the information received from the terminal 110.

The service server 130 transmits the route information to the terminal 110 as the navigation client which then receives and provides the route information to a user in a route transmission step S312.

There can be no time series order between the route transmission step S312 and the route transmission step S314. The two steps may be performed simultaneously or in different orders. The service server 130 transmits the route information generated in the route request step S310 to the traffic analysis server 140. The traffic analysis server 140 stores the route information for each navigation client in the database 250 in a route storing step S315.

Different from a conventional method which issues another route request when a preset time has passed, the embodiment of the present disclosure carries out the traffic condition check request step S316. In the traffic condition check request step S316, the navigation client requests the service server 130 for checking whether the traffic condition has changed.

The service server 130 receives the traffic condition check request signal from the navigation client in the traffic condition check request step S316. In another traffic condition check request step S318, the service server 130 transmits information on the terminal 110 and the traffic condition check request signal to the traffic analysis server 140.

The traffic analysis server 140 receives the traffic condition check request signal and the information on the terminal 110 from the service server 130. The traffic condition change calculation unit 240 checks the traffic condition change of the route stored for each terminal and transmits information on whether a route recalculation is necessary to the service server 130 in the detected traffic change transmission step S320. A step for determining the necessity for a route recalculation will be described later.

The service server 130 informs the navigation client of whether a route recalculation is necessary or not in another detected traffic change transmission step S322. In the present flowchart, description will be made for the case when the route recalculation is necessary.

The navigation client transmits the route request signal along with the current location of the terminal 110 to the service server 130 in the route recalculation request step S324.

The service server 130 recalculates the route based on the route request signal, the updated current location information and the previously registered destination information.

The service server 130 transmits the newly calculated route to the navigation client in the recalculated route transmission step S326. The service server 130 transmits information on the new route to the traffic analysis server 140 in the recalculated route transmission step S328, and stores the information on the new route in the database 250 in the route storing step S329.

The above-described steps may easily be modified within the scope to those skilled in the art. For example, the determination at the detected traffic change transmission step S320 for requesting the route recalculation can be the basis for skipping the detected traffic change transmission step S322 and the route recalculation request step S324 of the terminal 110 progressing directly to the updated recalculated route transmission S326.

Figure 4:
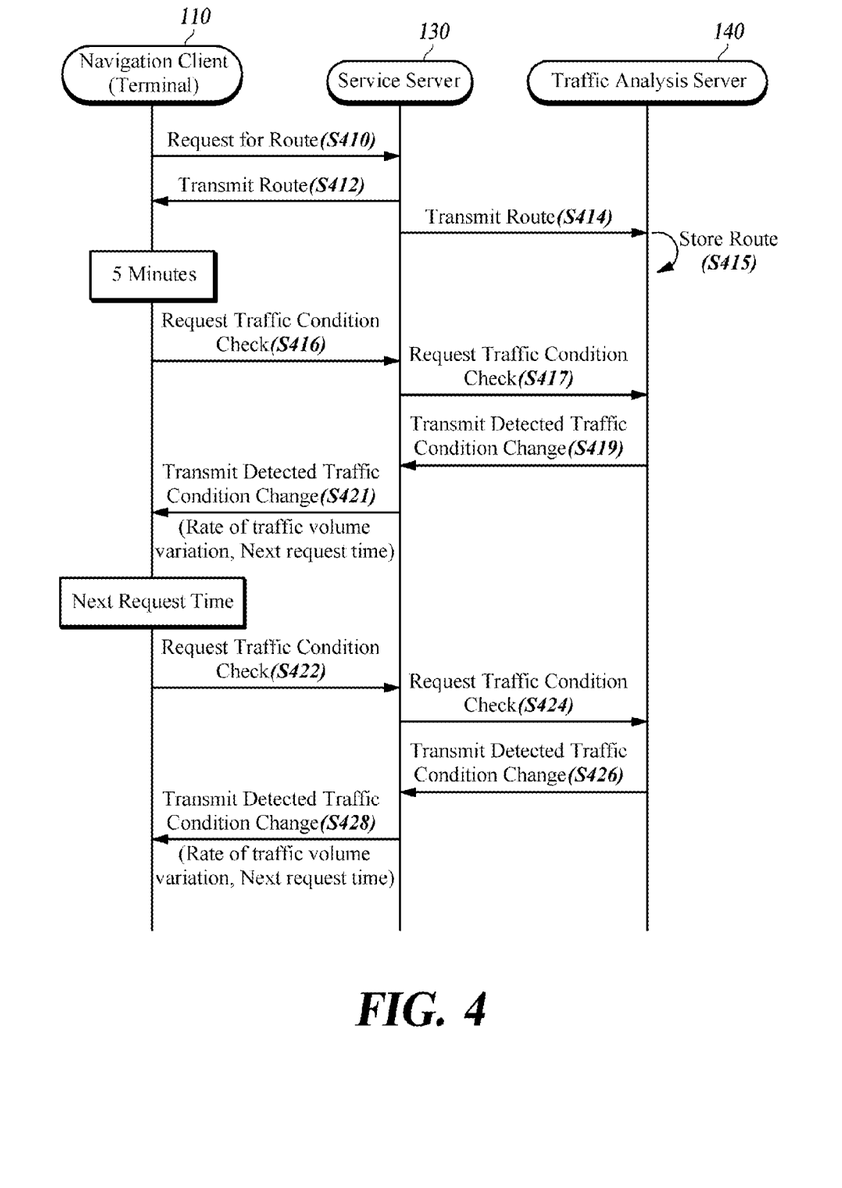
FIG. 4 is a flowchart in case there is no need for route change according to at least one embodiment of the present disclosure.

FIG. 4 is a flowchart in case there is no need for route change according to at least one embodiment of the present disclosure.

The navigation client transmits location information of the terminal 110, its destination information and a route request signal to the service server 130 in the route request step S410.

The service server 130 calculates the route using the route searching unit 220 and transmits the calculated route to the navigation client in a route transmission step S412.

The service server 130 transmits the searched route to the traffic analysis server 140 at the route transmission step S414. The traffic analysis server 140 stores the route of the user in the database 250 in a route storing step S415. There is no specific chronological order between the route transmission step S414 or the route storing step S415 and the route transmission step S412.

After the lapse of user-setting duration such as five minutes from the initial route request, the navigation client transmits the traffic condition check request to the service server 130 through the communication network 120 in the traffic condition check request step S416.

The service server 130 transmits the traffic condition check request to the traffic analysis server 140 in the traffic condition check request step S417.

The traffic analysis server 140 monitors the changes in traffic condition by comparing the traffic information on the route of the user with the real-time traffic information, and transmits the traffic volume change when it does not exceed a threshold. Steps for checking and transmitting the traffic volume change will be described later.

The service server 130 transmits either the traffic volume change or the next request time reflecting the traffic volume change to the navigation client in the detected traffic change transmission step S421. Upon receiving the former transmission, the navigation client determines the next request time (5 minutes, 10 minutes, 15 minutes or the like) depending on the traffic volume change.

When the next request time arrives after the receipt or the determination, the navigation client requests the service server 130 for a traffic condition check by yet another traffic condition check request step S422.

The steps S417 to S422 are repeated until the navigation client arrives at the destination.

The above-described method provides less frequent route calculations by determining insignificant changes in traffic condition which obviates the need for route recalculation and thereby reduces the frequency of requests by the terminal.

The following description explains a method of determining whether a route recalculation is necessary.

If the traffic condition shows a change in comparison with the traffic condition observed at the time of the initial route search, the route recalculation is necessary.

Since the vehicle on the road cannot cross the centerline, only the straight ahead is allowed in a traveling direction. Accordingly, a route has at least one link which is defined by a section between two points where turning is allowed. The link is a unit constituting the route searching. The traffic condition is stored in the form of information on traffic speed or traffic density measured per link.

The initial route can be divided into links and stored by using information on the speed and density of traffic at the time of the route search.

When determining as to whether a route recalculation is necessary, the current speed for each link of the initial route is checked. The current speed is compared with a stored speed during the initial route search to observe the change in the traffic condition, which is used to determine whether the route recalculation is necessary or not. The past route needs not be considered in determining the necessity of route recalculation and therefore the accuracy of the method of the present disclosure can be increased by comparing the current traffic condition with the stored traffic condition only from the current location to the destination. Although the following description is made to a method of making the comparison with regard to the entire route as of the initial route search, modifications thereof as obvious to those skilled in the art should be interpreted to be within the scope of the present disclosure.

The detailed method for determining the necessity for a route recalculation is as the following exemplary embodiment.

Based on images of a traffic speed or a traffic density taken by a CCTV, speed by link are classified into congestion, delay, slow and smooth speeds and stored accordingly. The traffic condition represented by congestion, delay, slow or smooth at the initial route search is compared link-wise to that at the present time, and the rate of change is calculated by percentage. For example, when a 10-link route has been searched at the initial search and if the traffic condition changes occurred in five links, the rate of change is determined as 50%. When the percentage exceeds a critical point or threshold value, a route recalculation is determined to be necessary. The representation of the 4 traffic conditions can be expressed using only two bits (four states) of link-wise speed data and thus can increase the operation speed of the method.

Alternatively, determining the necessity for a route recalculation may be performed based on a traffic speed ratio. Each link of a route has its speed information, and thus the speed differences between the past and present for each link add up to a sum of speed differences and its ratio to a sum of the speeds as of the route provision is calculated by percentage. This calculation is expressed by the following mathematical equation 1.

$$\frac{\text{Sum of link-wise speed differences}}{\text{Sum of speeds as of route provision}} = 100\% \qquad \text{Equation 1}$$

For example, in a route consisting of links A, B and C with respective speeds as in table 1, the calculation follows equation 2.

TABLE 1

| Link | Speed as of initial route search (Km/h) | Current speed (Km/h) |
| --- | --- | --- |
| A | 40 | 30 |
| B | 30 | 15 |
| C | 10 | 25 |

$$\frac{|40-30|+|30-15|+|10-25|}{40+30+10} = 100\% = 50\% \qquad \text{Equation 2}$$

When the percentage exceeds a threshold which is subject to a setting, the route recalculation is determined to be necessary.

Another alternative is to consider the fact that the estimated drive time over the entire route is represented by the sum of the respective times for the links calculated by using information on the respective route distances and speeds and therefore the sum of the respective times taken can be compared with the total currently estimated drive time calculated by using the new traffic information and calculated by percentage. When the calculated percentage exceeds a threshold, the route recalculation can be determined to be necessary.

Herein, the preferred embodiments of the method of checking traffic condition change merely illustrate link-based implements thereof and they should not be interpreted to limit the scope of right to the present disclosure. The present disclosure features storing a route for each terminal and traffic conditions for each route and comparing the stored traffic conditions with updated traffic conditions to control the frequency of the route recalculation requests from the terminals 110. If information on traffic conditions such as link-wise speeds, accident and typical congestion time (e.g. rush hour) is further given, the comparison method can be easily modified within the scope obvious to these skilled in the art.

Conventional communication-based navigation systems require that the terminal 110 recalculate the route automatically periodically, along with information on the current position and the destination. However, such automatic and periodical route recalculation is a waste of resources of the server and communication network 120 since there usually are little chances in traffic condition in short period.

The aforementioned system for reducing the route searching frequency by monitoring the traffic change lowers the frequency of requesting route searches or recalculations which are likely to generate the same result. This can be implemented by storing a route for each terminal and traffic conditions for each route and comparing the stored conditions with updated traffic conditions, whereby reducing the resource requirements of the server and communication network 120.

In addition, the present disclosure provides an efficient management of storage of pre-recalculation routes per terminal until there is a change of destination or a request for a new route search rather than a route recalculation and accordingly displays the initially searched route simultaneously with the route recalculation in at least one embodiment.

Figure 5:
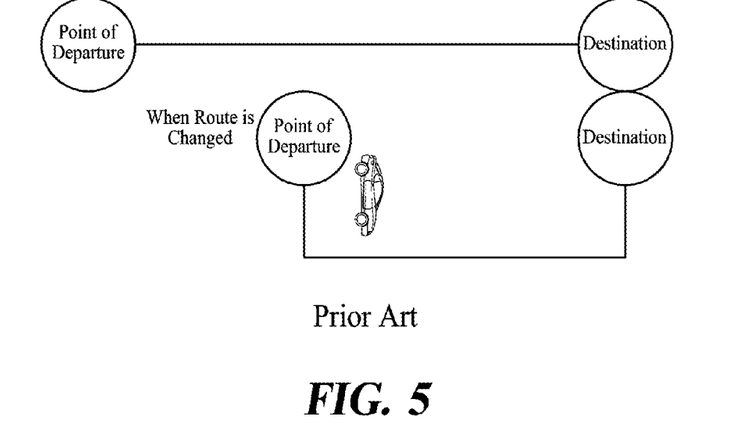
FIG. 5 is a diagram of a route screen of a conventional communication-based navigation.
Figure 6:
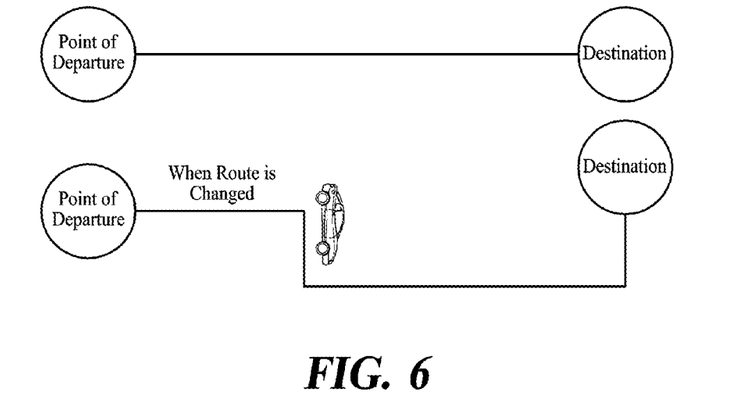
FIG. 6 is a diagram of a route screen of at least one embodiment of the present disclosure.

FIGS. 5 and 6 are diagrams of respective route screens of conventional communication-based navigation and at least one embodiment of the present disclosure.

In at least one embodiment like the conventional one, the present disclosure recalculates a route from the current position to the destination, too. However, the present disclosure stores pre-recalculation information per terminal in the database 250 and compares the speeds of respective links, whereby keeping the initially searched route information in storage. In comparison, the conventional automatic route recalculation technique as illustrated in FIG. 5 replaces an initially searched route with a display of recalculated route and provides no information on the user's departure location, only allowing the user to simply recognize a new route recalculated. A feature of the present disclosure in at least one embodiment to store the initially searched route allows it to be additionally displayed as FIG. 6 so that the user can check the new route along with the route from the departure location all the way to the destination and the user is provided with the effect of route changing rather than recalculating.

According to the present disclosure as described above, server resources are saved by a simple operation of storing and comparing traffic volumes for each route with respect to an insignificant traffic condition change rather than performing route recalculations, reducing and the frequencies of communications of the terminals and server.

Although exemplary embodiments of the present disclosure have been described for illustrative purposes, those skilled in the art will appreciate that various modifications, additions and substitutions are possible, without departing from the various characteristics of the disclosure. Therefore, exemplary embodiments of the present disclosure have been described for the sake of brevity and clarity. Accordingly, one of ordinary skill would understand that the scope of the disclosure is not limited by the explicitly described above embodiments but by the claims and equivalents thereof.

What is claimed is:

1. A communication-based navigation system, comprising:
a terminal configured to transmit a route request signal and a traffic condition check request signal;
a service server including a route searching unit configured
to receive the route request signal from the terminal, and
to search a route in response to the route request signal; and
a traffic analysis server including
a database configured to store the route and a traffic condition on the route, and
a traffic condition change calculation unit configured
to compare the traffic condition stored in the database with a current traffic condition, and
to calculate a traffic condition change, wherein
the service server is configured
to transmit the route to the terminal and the traffic analysis server,
to receive the traffic condition check request signal from the terminal, and
to transmit the traffic condition check request signal to the traffic analysis server,
the traffic analysis server is configured
upon receiving the route from the service serve, to receive the traffic condition on the route from an external traffic information providing source and to store the route and the traffic condition on the route in the database in association with the terminal,
upon receiving the traffic condition check request signal from the service server, to compare the traffic condition stored in the database with the current traffic condition and to calculate the traffic condition change,
to perform a determination whether or not a re-search of the route is needed based on the traffic condition change, and
to transmit the traffic condition change and a result of the determination to the service server,
the service server is configured, upon receiving the traffic condition change and the result of determination from the traffic analysis server, to transmit the traffic condition change, a transmission cycle of the traffic condition check request signal determined based on the traffic condition change, or the result of determination to the terminal, and
the terminal is configured
upon receiving the traffic condition change from the service server, to determine a transmission cycle of the traffic condition check request signal based on the traffic condition change and to transmit the traffic condition check request signal based on a determined transmission cycle,
upon receiving the transmission cycle of the traffic condition check request signal from the service server, to transmit the traffic condition check request signal based on a received transmission cycle, and
upon receiving the result of determination and when the result of determination indicates that the re-search of the route is needed, to transmit a route recalculation request signal to the service server.

2. The communication-based navigation system of claim 1, wherein the traffic condition stored in the traffic analysis server is updated in real time.

3. The communication-based navigation system of claim 1, wherein the smaller a magnitude of the traffic condition change, the longer a period for transmitting the traffic condition check request signal by the terminal.

4. The communication-based navigation system of claim 1, wherein the service server is further configured
to perform a route recalculation upon receiving the route recalculation request signal from the terminal, and
to provide a result of the route recalculation along with a travel path from an initial point of departure to a current location.

5. The communication-based navigation system of claim 1, wherein the traffic analysis server is further configured to store the traffic condition for each link along the route.

6. The communication-based navigation system of claim 5, wherein
the traffic condition includes a density or a speed of traffic for each link on the route, and
the traffic condition change includes a ratio of a number of links of which a density or a speed of traffic is changed over a number of the all links on the route.

7. The communication-based navigation system of claim 5, wherein the traffic condition change includes a ratio of a sum of differences between a current speed and a previous speed of traffic by unit of link along the route over a sum of stored speeds for all links.

8. The communication-based navigation system of claim 1, wherein the traffic condition change includes a ratio of an estimated time for reaching a destination driving the route at a time of searching the route over an estimated time for reaching the destination from a current location.

9. A communication-based navigation system, comprising:
   a terminal configured to transmit a route request signal and a traffic condition check request signal; and
   a service server including a route searching unit configured to receive the route request signal from the terminal, and to search a route in response to the route request signal,
   a database configured to store the route and a traffic condition on the route, and
   a traffic condition change calculation unit configured to compare the traffic condition stored in the database with a current traffic condition, and to calculate a traffic condition change, wherein
   the service server is configured
      to transmit the route to the terminal,
      to receive the traffic condition check request signal from the terminal,
      to receive the traffic condition on the route from an external traffic information providing source and to store the route and the traffic condition on the route in the database in association with the terminal,
      upon receiving the traffic condition check request signal from the terminal, to compare the traffic condition stored in the database with the current traffic condition and to calculate the traffic condition change,
      to perform a determination whether or not a re-search of the route is needed based on the traffic condition change, and
      to transmit the traffic condition change, a transmission cycle of the traffic condition check request signal determined based on the traffic condition change, or a result of the determination to the terminal, and
   the terminal is configured
      upon receiving the traffic condition change from the service server, to determine a transmission cycle of the traffic condition check request signal based on the traffic condition change and to transmit the traffic condition check request signal based on a determined transmission cycle,
      upon receiving the transmission cycle of the traffic condition check request signal from the service server, to transmit the traffic condition check request signal based on a received transmission cycle, and
      upon receiving the result of the determination and when the result of determination indicates that the re-search of the route is needed, to transmit a route recalculation request signal to the service server.

10. A method of calculating a route in a communication-based navigation system including a terminal and a service server, the method comprising:
    a first step including the terminal transmitting a route request signal and a traffic condition check request signal; and
    a second step including the service server
       receiving the route request signal from the terminal,
       searching a route in response to the route request signal,
       storing the route and a traffic condition on the route in a database,
       comparing the traffic condition stored in the database with a current traffic condition, and
       calculating a traffic condition change, wherein
    the second step further includes the service server
       transmitting the route to the terminal,
       receiving the traffic condition check request signal from the terminal,
       receiving the traffic condition on the route from an external traffic information providing source and storing the route and the traffic condition on the route in the database in association with the terminal,
       upon receiving the traffic condition check request signal from the terminal, comparing the traffic condition stored in the database with the current traffic condition and calculating the traffic condition change,
       performing a determination whether or not a re-search of the route is needed based on the traffic condition change, and
       transmitting the traffic condition change, a transmission cycle of the traffic condition check request signal determined based on the traffic condition change, or a result of the determination to the terminal, and
    the first step further includes the terminal
       upon receiving the traffic condition change from the service server, determining a transmission cycle of the traffic condition check request signal based on the traffic condition change and transmitting the traffic condition check request signal based on a determined transmission cycle,
       upon receiving the transmission cycle of the traffic condition check request signal from the service server, transmitting the traffic condition check request signal based on a received transmission cycle, and
       upon receiving the result of determination and when the result of determination indicates that the re-search of the route is needed, transmitting a route recalculation request signal to the service server.

11. The method of claim 10, wherein a frequency of transmitting the traffic condition check request signal is decreased as a degree of the traffic condition change decreases and the frequency of transmitting the traffic condition check request signal is increased as the degree of the traffic condition change increases.

* * * * *